(12) United States Patent
Lakshmanan et al.

(10) Patent No.: US 8,479,026 B2
(45) Date of Patent: Jul. 2, 2013

(54) PROCESSOR POWER MANAGEMENT

(75) Inventors: Karthik Singaram Lakshmanan, Plano, TX (US); Sejoong Lee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 305 days.

(21) Appl. No.: 12/963,948

(22) Filed: Dec. 9, 2010

(65) Prior Publication Data

US 2011/0138197 A1 Jun. 9, 2011

Related U.S. Application Data

(60) Provisional application No. 61/285,008, filed on Dec. 9, 2009.

(51) Int. Cl.
| | |
|---|---|
| *G06F 1/00* | (2006.01) |
| *G06F 1/26* | (2006.01) |
| *G06F 11/30* | (2006.01) |
| *G01R 21/00* | (2006.01) |
| *G01R 19/00* | (2006.01) |

(52) U.S. Cl.
USPC ............. 713/300; 713/320; 713/322; 702/60; 702/64; 702/182

(58) Field of Classification Search
USPC ............... 713/300, 320, 322; 702/60, 64, 182
See application file for complete search history.

(56) References Cited

U.S. PATENT DOCUMENTS

| | | | | |
|---|---|---|---|---|
| 6,834,354 | B1 * | 12/2004 | Togawa ........................ | 713/320 |
| 7,080,267 | B2 | 7/2006 | Gary et al. | |
| 7,191,446 | B2 | 3/2007 | Kosanovic | |
| 7,194,385 | B2 * | 3/2007 | Flautner et al. .............. | 702/186 |
| 7,321,568 | B2 | 1/2008 | Kosanovic et al. | |
| 7,353,217 | B2 | 4/2008 | Kosanovic et al. | |
| 7,464,379 | B2 | 12/2008 | Kanai et al. | |
| 7,698,575 | B2 * | 4/2010 | Samson ........................ | 713/300 |
| 8,086,884 | B2 * | 12/2011 | Naffziger ..................... | 713/322 |
| 2008/0022140 | A1 | 1/2008 | Yamada et al. | |
| 2010/0162023 | A1* | 6/2010 | Rotem et al. ................. | 713/340 |

OTHER PUBLICATIONS

Lorch, Jacob, R. et al., "PACE: A New Approach to Dynamic Voltage Scaling," IEEE Transactions on Computers, vol. 53, No. 7, Jul. 2004, 14 pages.

* cited by examiner

*Primary Examiner* — Stefan Stoynov
(74) *Attorney, Agent, or Firm* — Steven A. Shaw; W. James Brady; Frederick J. Telecky, Jr.

(57) ABSTRACT

A method comprises operating a processor at a first power control strategy. Such a method further comprises determining whether a workload of a task running on a processor has fallen below a lower threshold, and changing to a second power control strategy to operate the processor based on determining that the workload of the task has fallen below the lower threshold.

23 Claims, 4 Drawing Sheets

PROCESSOR POWER MANAGEMENT

CROSS-REFERENCE TO RELATED APPLICATION

The present application claims priority to U.S. Provisional Patent Application No. 61/285,008, filed on Dec. 9, 2009; which is hereby incorporated herein by reference.

BACKGROUND

For many electronic systems, reducing power consumption, all else being equal, is desirable. For example, some electronic systems are battery-powered and power consumption reduction will permit the battery to last longer. Maintaining satisfactory performance levels, however, is also desirable. At times, the desire for reducing power consumption and the desire for higher performance levels are at odds with each other, and tradeoffs are made. That is, a system may sacrifice performance for battery charge longevity, and at other times may sacrifice battery power for performance.

One of the settings in an electronic system that often can be adjusted to vary performance and power consumption is the clock frequency of the processor. A slower clock frequency causes the processor to run slower and thus at a lower performance level but also results in lower power consumption per unit of time. A higher clock frequency results in a higher performance level but also at a higher power consumption level per unit of time. Often, the supply voltage is also scaled for different clock frequencies thereby permitting control over energy or average power consumption.

Some electronic systems may be implemented so as to meet worst-case workload requirements. While the workload need may be relatively low at any point in time (e.g., at night), the possibility exists that the workload need may suddenly spike and thus the system is configured to operate assuming that the worst-case workload need may actually occur. Power is wasted when the system is configured for a higher performance level that is not necessitated by present workload demands.

SUMMARY

Some embodiments are directed to a method that comprises operating a processor at a first power control strategy. Such methods further comprise determining whether a workload of a task running on a processor has fallen below a lower threshold, and changing to a second power control strategy to operate the processor based on determining that the workload of the task has fallen below the lower threshold.

Other embodiments are directed to a system that comprises a processor and a power and clock supply coupled to the processor. The processor asserts an operating point signal to the power and clock supply to cause the power and clock supply to implement an operating point for the processor. The processor asserts the operating point signal to cause the power and clock supply to operate the processor in a first power controls strategy, and determines whether a workload of a task running on the processor has fallen below a lower threshold. Based on the workload of the task being below the lower threshold, the processor asserts the operating signal to cause the power and clock supply to operate the processor in a second power control strategy.

Yet other embodiments are directed to a processor comprising a processor core and a dynamic power control (DPC). The DPC asserts an operating point signal to a power and clock supply to cause the power and clock supply to implement an operating point for the processor; and. The DPC asserts the operating point signal to request the power and clock supply to operate the processor in a first power controls strategy and determines whether a workload of a task running on the processor has fallen below a lower threshold. Based on the workload of the task being below the lower threshold, the DPC asserts the operating signal to request the power and clock supply to operate the processor in a second power control strategy.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
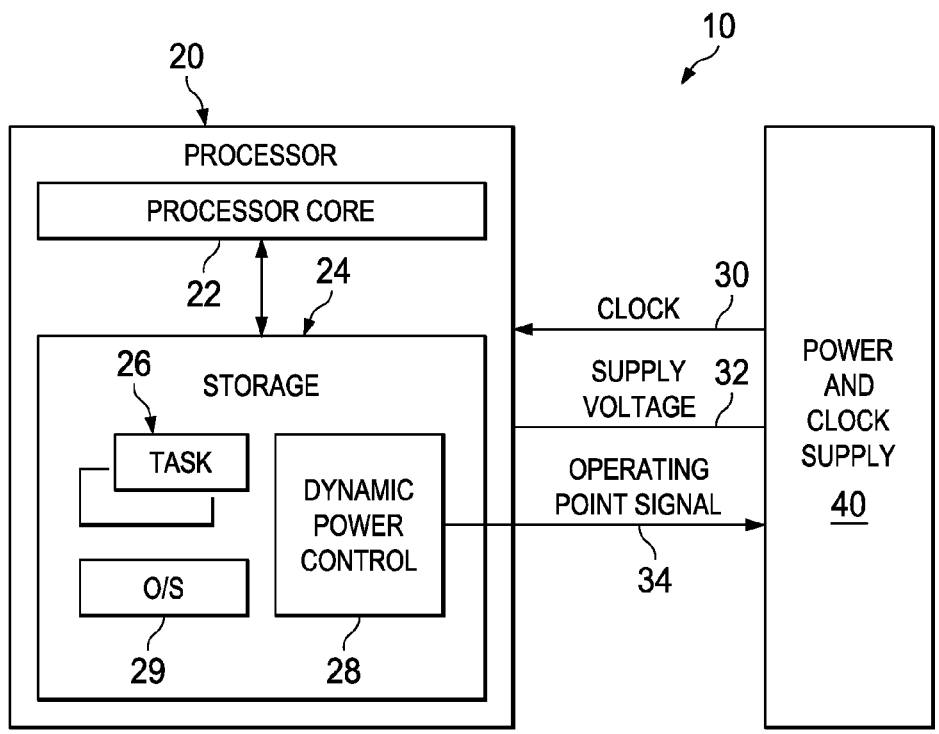
FIG. 1 a system in accordance with a preferred embodiment.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Processors execute one or more tasks. While the processor may only be able to execute one task at a time, multiple tasks execute concurrently. That is, the processor executes a portion of one task, then switches to another task and executes a portion of that task, then switches back to former task or to yet another task, and so on. The processor must switch contexts each time it switches from one task to another. The context switch includes, for example, saving the processor's current registers (e.g., program counter) to memory and loading the new tasks register data from memory into the processor's internal registers. Each task is allotted a period of time to complete each execution cycle of that task. The portion of the task being executed by the processor must complete within the allocated time period to avoid impacting the execution of other tasks. A scheduler in an operating system coordinates which tasks are to be executed by the processor.

The term "workload" is used in this disclosure. The workload of a task is the actual number of processor clock cycles needed to complete the task divided by the maximum number of cycles allocated for the task to complete. The timing of a task may be characterized by a C, T, D model (worst case cycle time (C), shortest inter-arrival time (T), and deadline (D)). For example, a task's C, T, D definition may be {1000 clock cycles, 1 ms, 0.5 ms} meaning that the task will arrive to be executed by the processor every 1 ms and have 1000 clock cycles to complete and the task must be completed within 0.5 ms. By way of example, a workload of 100% means that all 1000 cycles were needed by the processor to complete the task within the 0.5 ms deadline. Similarly, a workload of 70% means that the task only required 700 cycles to complete within the 0.5 ms deadline.

It has been observed that often processor experience a highly dynamic workload exhibiting large variations. Run-time adaptations to the actual workload can thus provide significant opportunities for power savings. Described herein is a technique for opportunistic adaptive dynamic power control in real-time systems with variable run-time workloads.

In accordance with the preferred embodiment, a processor is configured to operate at different operating points (OPP) or performance states determined by a clock frequency and corresponding supply voltage. The dynamic power control technique described herein selects an appropriate power control strategy based on an assessment of processor workload. The selected power control strategy preferably initially implements a relatively low OPP (e.g., low clock frequency) while at the same time guarantees that each task executed by the processor will timely complete within its maximum permitted time period.

FIG. 1 shows a block diagram of a system 10 in accordance with a preferred embodiment. As shown, system 10 comprises a processor 20 coupled to a power and clock supply 40. The power and clock supply 40 supplies the processor with a variable clock signal 30 and a variable supply voltage 32. Via an OPP signal 34 from the processor 20, the power and clock supply 40 supplies a combination of a particular clock signal frequency and a particular supply voltage to operate the processor 20. The clock frequency can be varied between any number of frequencies, such as 800 MHz, 1 GHz, and 1.2 GHz, although other frequencies are possible as well. The voltage level of the supply voltage 32 is set by the power and clock supply 40 commensurate with the particular clock frequency. In general, higher clock frequencies require higher supply voltage levels. The OPP signal 34 commands the power and clock supply to operate the processor 20 at a particular OPP. The power and clock supply 40 implements a particular clock frequency and supply voltage level commensurate with the requested OPP.

The processor 20 comprises a processor core 22 coupled to storage 24. Although a single core is shown in FIG. 1, multiple cores may be provided in other embodiments. The storage 24 may be on the same die/package as the core 22 or separate from, but accessible to, the core. The storage 24 may comprise volatile memory (e.g., random access memory), non-volatile storage (Flash memory, read-only memory, hard disk drive, etc.), or combinations thereof. The storage 24 contains one or more tasks 26 which are executed by the processor core 22. The storage 24 also contains a dynamic power control (DPC) module 28 and an operating system (O/S) 29. In the embodiment of FIG. 1, the dynamic power control module 28 comprises code executable by the processor 22, but in other embodiments, the dynamic power control module 28 comprises a discrete hardware circuit. The operating system 29 also comprises code executable by the processor 22. In some embodiments, the processor 20 may be an embedded processor as part of a larger system.

Figure 2:
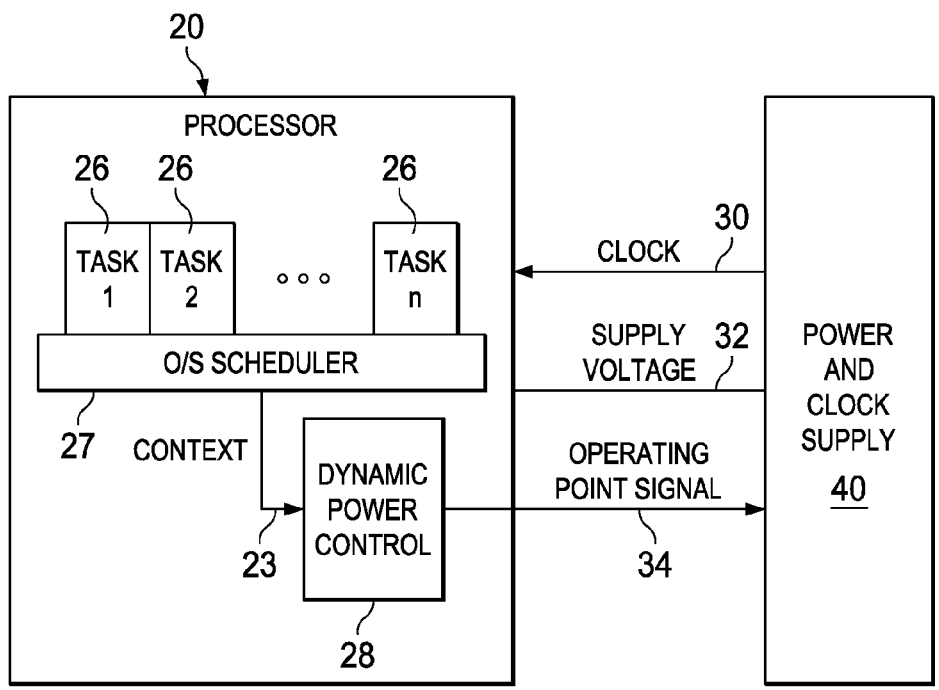
FIG. 2 illustrates some of the software components of the system of FIG. 1.

FIG. 2 depicts a software view of the processor 20 in accordance with preferred embodiments of the invention. One or more tasks 26 run on top of an operating system scheduler 27 which is part of, or otherwise associated with, the operating system 29. The O/S scheduler 27 selects one task 26 at a time for execution by the processor core. Each time the O/S scheduler 27 causes a new task 26 to run on the processor core, a change of context occurs. Context switching information 23 provided by the O/S scheduler 27 includes some or all of the context information associated with the context for each task run on the processor 22. Such context information will be explained in greater detail.

A goal of the dynamic power control module 28 is to command the power and clock supply 40 to implement an OPP for the processor 20 that reduces the power consumption of the processor as much as possible while still able to guarantee completion of all tasks within their assigned deadlines. In accordance with at least some embodiments of the invention, two power control strategies are available for operation of the processor 20—a first power control strategy and a second power control strategy. Any number of power control strategies can be implemented.

Figure 3:
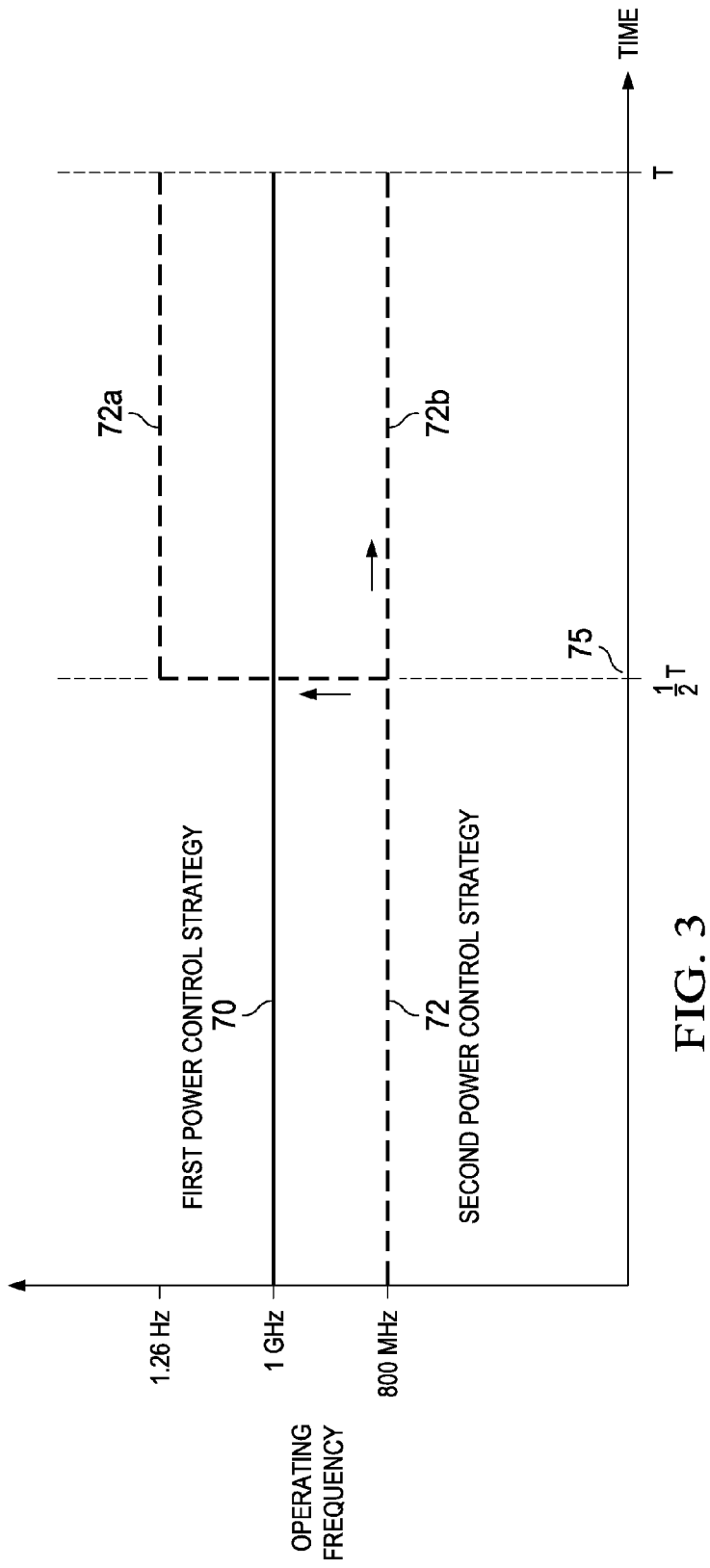
FIG. 3 depicts several exemplary power control strategies for operation of a processor.

FIG. 3 illustrates the first and second power control strategies in accordance with a preferred embodiment of the invention. The power control strategies are designated as first power control strategy 70 and second power control strategy 72. Each strategy is represented by a processor clock frequency with respect to time. The time T is the deadline by which a task must complete its execution on processor 22. Point 75 is referred to as the "marker point" or the "OPP transition point."

The difference between the two power control strategies is the OPP, and in the embodiments shown herein different OPPs have different clock frequencies set for the processor. Preferably, the first power control strategy 70 includes a continuous clock frequency. In the example of FIG. 3, the continuous clock frequency for the first power control strategy 70 is 1 GHz, although the frequency can be other than 1 GHz. While operating in accordance with the first power control strategy 70, the processor operates at 1 GHz continuously. The 1 GHz frequency is sufficient to ensure that the task completes by deadline T.

The second power control strategy 72 includes an initial lower OPP/clock frequency. In the preferred embodiment, the initial clock frequency for the second power control strategy 72 is 800 MHz, although that frequency can be other than 800 MHz. The clock frequency remains at 800 MHz until the marker point 75 is reached. The expectation is that the task will have completed before the marker point 75 is reached even at the lower clock frequency (800 MHz). However, the marker point 75, which may be T/2 in accordance with some embodiments, is set so that if the task has not completed by the time the marker point 75 is reached, the clock frequency can be increased to 72a. A task that has not completed by mark point 75 is in danger of missing its completion deadline T. In some embodiments, the higher clock frequency at 72a is 1.2 GHz, but this frequency can be different than 1.2 GHz in other embodiments. If the task has completed by the time the marker point 75 is reached, the clock frequency is not increased and remains at the lower OPP level 72b (800 MHz).

The arrow heads on dashed lines 72*a* and 72*b* illustrate that the alternatives for the OPP for the second power control strategy once mark point 75 has been reached for a given task. Thus, for the second power control strategy 72, the initial clock frequency is set a lower level than for the first power control strategy 70, and increases to the higher clock frequency 72*a* only if the task has not completed by marker point 75, otherwise the clock frequency remains low. By potentially being able to keep the clock frequency at the lower level 72*b*, power is saved relative to the power consumption of the first power control strategy with its higher clock frequency. However, if the task is in danger of missing its deadline, the DPC 28 is able to increase the clock frequency with enough time remaining to ensure that the task completes before deadline T. The marker point 75 can be determined ahead of time based on simulations or other types of testing, or simply fixed to a particular value as desired.

Both power control strategies are set so as to guarantee completion of the task before its deadline T. One power control strategy may result in lower power consumption than the other strategy depending on the workload of the task. For example, for tasks with workloads less than, for example, 40% (i.e., light workloads), the second power control strategy 72 may consume less power than the first power control strategy 70. However, for workloads at higher levels (e.g., greater than 75%), the first power control strategy 70 may consume less power than the second power control strategy 72. Consequently, selection of the power control strategy is based on workload of the tasks, and preferably a prediction of future task workload.

Figure 4:
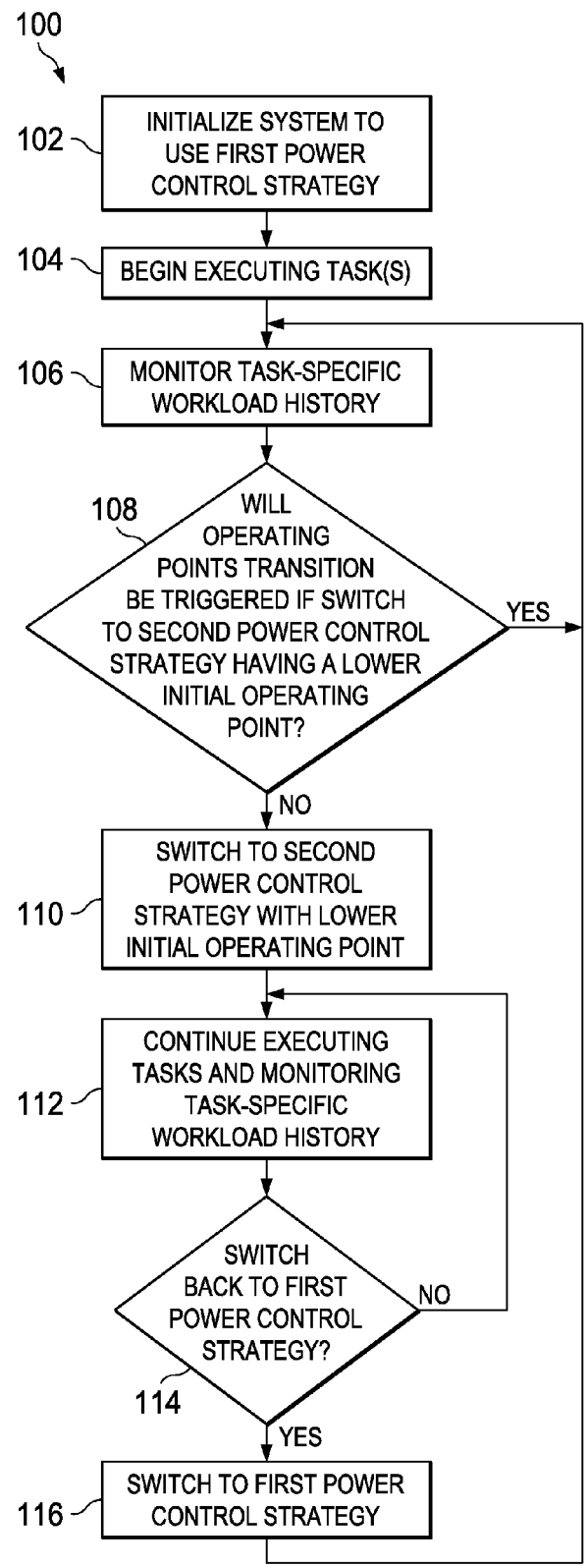
FIG. 4 provides a flowchart illustrating a method in which one of multiple power control strategies are dynamically selected in accordance with a preferred embodiment.

FIG. 4 illustrates a method 100 in accordance with preferred embodiments of the invention. The method 100 is performed preferably by code executed by the processor 22 such as the DPC module 28. The actions can be performed in the order shown, or in a different order. Further, two or more of the actions can be performed in parallel.

At 102, the system 10 initializes and in so doing, initializes to use the first power control strategy 70 (a continuous clock frequency). Setting the OPP for the processor 20 to be the first power control strategy 70, albeit with a higher frequency than the initial frequency of the second power control strategy 72, ensures that all tasks initially are completed by their deadlines.

At 104, the method includes beginning to execute one more tasks 26. As explained above, the operating system scheduler 27 selects one task at a time to be run on the processor and coordinates context switching from one task to the next. One of the context information items is a maker timer value, which is the current count value of the timer as it counts. Each task thus has its own marker timer value. A marker timer for each task is reset to a value of T/2 each time a task begins to execute on the processor. The marker time then counts down toward 0. Alternatively, the marker timer could be initialized to a value of 0 and then count up to a terminal count value of T/2. If execution of a lower priority task is interrupted by a higher priority task, the marker timer for the interrupted lower priority task is saved to memory during the context switch and then reloaded and started again when the lower priority task is again run at a later time. The DPC 28 determines whether the marker timer for each task reaches its marker point 75. The marker timer value is used by the DPC 28 relative to the second power control strategy 72 as explained above. The DPC 28 causes a change in the processor's OPP to a higher level (e.g., higher frequency) if the task has not yet completed upon expiration of the marker timer. In some embodiments, other values in addition to the marker time value, such as the deadline value of D, may also be part of the context for a given task and loaded to/from memory upon a context switch.

At 106, while the tasks 26 are running, task-specific workload history information is generated and stored in, for example, storage 24. Preferably, the DPC 28 monitors the history of task workload by, for example, monitoring execution time of tasks using a timer such as the marker timer. Workload history may comprise a computed time average or may comprise the highest workload experienced during a certain period of time. Other techniques for determining and monitoring workload are possible as well.

At 108, the DCP 28 determines for any of the tasks currently running whether execution of any of the tasks will reach their marker point 75 before the task completes if the processor 20 were to execute in accordance with the second power control strategy 72. That is, if the OPP for the processor were reduced to a lower frequency, the DCP 28 determines whether any of the tasks will require longer than the marker point 75 to complete. If the answer is yes (a task will not be completed by the expiration of the marker timer), then control loops back to block 106 and the power control strategy remains set at the first power control strategy 70. However, if the answer is no (all tasks will complete by the expiration of the marker timer if the second power control strategy were to be implemented), the DCP 28 commands (via OPP signal 34) the power and clock supply 40 to transition from the first power control strategy 70 to the second power control strategy 72 (block 110). In at least some embodiments, this transition entails employing a lower clock frequency for the processor core 22 until marker point 75 is reached, remaining at the lower frequency if the tasks are completed by the at point, and otherwise increasing to a higher frequency to catch up execution of the task to guarantee the task completes by the deadline T. An alternative to 108 would be initiate a transition to the second power control strategy 72 based on the workload of all tasks being below a lower threshold (e.g., 40%).

At 112, the processor 20 continues executing tasks as scheduled by O/S scheduler 27 while continuing to monitor task-specific workload history of the tasks. If a certain condition is met, then at 114 the DCP 28 switches the power control strategy back to the first power control strategy 70 (block 116). If that condition is not met, then the power control strategy remains set at the second power control strategy. The condition may be, for example, expiration of the marker timer(s). For example, if a marker timer expires thereby triggering a change to the higher OPP, then that condition indicates that the actual workload is higher than what was expected by the current strategy. Therefore, the strategy is changed.

Figure 5:
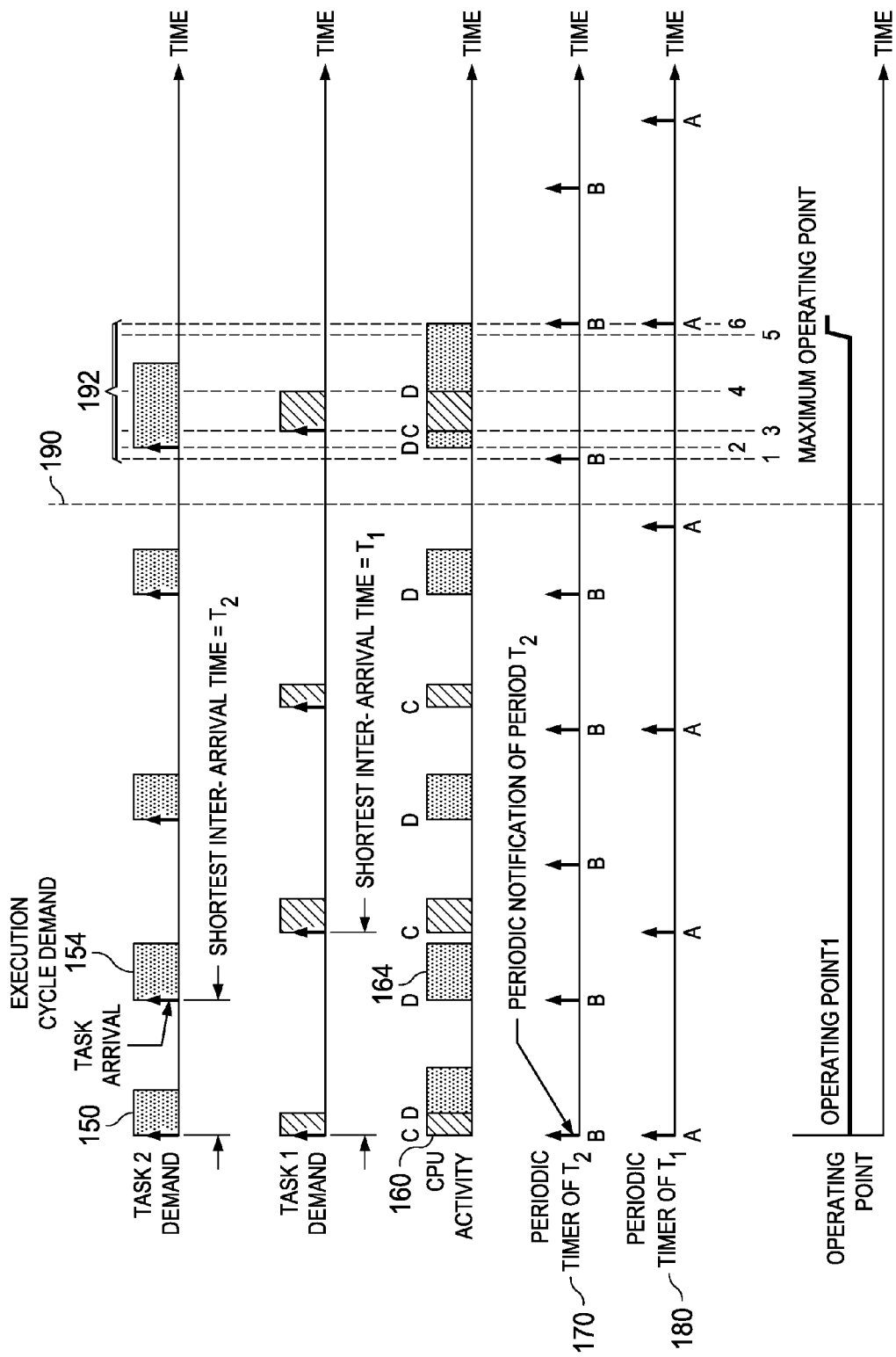
FIG. 5 depicts the operation of one of the illustrative power control strategies of FIG. 3.

FIG. 5 is a timing diagram that illustrating how the operation of the second power control strategy 72. As shown, two tasks (Task 1 and Task 2) execute on the processor 20 at discrete points in time. Task 1 has a higher priority than Task 2 and thus will be executed first by the processor if both tasks are presented to the processor for execution at the same time. At 150, demands for execution of both Tasks 1 and 2 are present concurrently. As Task 1 has a higher priority, Task 1 is executed first by the processor, then Task 2 as illustrated at 160. At 154, a demand for Task 2 is received before a demand for Task 1 with enough lag time so that Task 2 can complete before the Task 1 begins. Thus, Task 2 is executed first as depicted by 164.

The arrival time of each instance of Task 1 (as depicted by the arrows at the beginning of each task demand) can vary as illustrated by the non-uniform spacing of the arrows. The same is true for the spacing of the Task 2 demands. The shortest task interval arrive time for Task 1 is shown as $T_2$. The shortest task interval arrive time for Task 1 is shown as $T_1$.

Each task preferably uses a pair of timers—a marker timer as noted above and also a periodic timer. The periodic timers B for Task 2 are shown at 170 and the periodic timers A for Task 1 are shown at 180. The periodic timers for each task are set at the shortest inter-arrival timer period for each task. Thus, the Task 2 periodic timers B are set at $T_2$ and generate a signal at periodic intervals corresponding to time period $T_2$. Similarly, the Task 1 periodic timers A are set at $T_1$ and generate a signal at periodic intervals corresponding to time period $T_1$.

Between tick marks B of each periodic timer $T_1$ period, only one instance of Task 1 can execute and, to the extent Task 1 is invoked during that time period, the task must complete. Similarly, between tick marks A of each periodic timer $T_2$ period, only one instance of Task 2 can execute and, to the extent Task 2 is invoked during that time period, the task must complete.

At the beginning of every time period $T_1$ (as signaled by Task 1's periodic timer), the periodic timer causes the marker timer for Task 1 to be reset (but not necessarily started to count). Similarly, at the beginning of every time period $T_2$ (as signaled by Task 2's periodic timer), the periodic timer causes the marker timer for Task 2 to be reset (but not necessarily started to count). The marker timers are caused to begin counting upon occurrence of the beginning of a task. Thus, the arrows on the first two lines in FIG. 5 (Task 2 demand and Task 1 demand) indicate when the respective marker timers are started.

Upon until point 190, all of Tasks 1 and 2 complete before the respective marker timers reach the marker points (e.g., T/2). As such, during that portion of the operation of the processor, there have not been tasks that trigger a change in OPP transition. All tasks have completed before the marker point 75 and the processor's OPP remains at the lower frequency level (e.g., 800 MHz as in FIG. 3).

Referring still to FIG. 5, reference numeral 192 illustrates an example of when a marker timer expires before the task has completed. At point 1, the maker timer for Task 2 is reset to 0. At point 2, Task 2 begins and the maker time for Task 2 is started as well. At point 3, Task 1 is scheduled for execution on the processor while Task 2 is still executing. As Task 1 has a higher priority, Task 1 interrupts execution of Task 2. A context switch from Task 2 to Task 1 occurs to temporarily halt Task 2 and permit Task 1 to be executed. The context switch includes, among other things, pausing and saving the Task 2 marker timer. At the same time, the marker timer for Task 1 is started.

At point 4, Task 1 completes execution and another context switch back to Task 1 occurs. The previously saved Task 2 marker timer is reloaded and resumed. Task 2 itself also resumes. At point 5, the marker time for Task 2 expires (reach, for example, point T/2) and alerts that it has hit the marker point 75 for Task 2. At that point, the OPP for the processor is changed to a higher level (e.g., 1.2 GHz) to guarantee that Task 2 will complete before deadline T.

The processor 20 continues to be operated with the higher OPP level preferably until all of the periodic timers of the various tasks hit their next period (point 6 in FIG. 5). At that point, the next power control strategy is selected based on workload history. In some embodiments, the power control strategy may revert back to the former power control strategy (e.g., the second power control strategy 72), while in other embodiments, the strategy may different than the former strategy. For example, the new power control strategy might comprise a strategy similar to the second power control strategy 72 but with an initial and higher OPP level The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   operating a processor at a first power control strategy;
   determining whether a workload of a task running on a processor has fallen below a lower threshold; and
   changing to a second power control strategy to operate the processor based on determining that the workload of the task has fallen below the lower threshold, wherein the second power control strategy initially includes a lower frequency for operating the processor and then switches to a higher frequency based on the task not completing by a marker point in time.

2. The method of claim 1 wherein the first power control strategy includes a continuous clock frequency.

3. The method of claim 1 wherein the second power control strategy includes the processor's frequency remaining at the lower frequency based on the task completing by the marker point in time.

4. The method of claim 1 further comprising changing from the second power control strategy to the first power control strategy based on the task not completing by the marker point in time.

5. The method of claim 1 further comprising running a plurality of tasks on the processor and wherein changing to the second power control strategy is based on determining that the workload of any of the tasks has fallen below the lower threshold.

6. The method of claim 1 further comprising:
   determining whether the workload of the task exceeds an upper threshold; and
   changing from the second power control strategy to the first power control strategy based on determining that the workload of the task has increased above the upper threshold.

7. The method of claim 6 wherein the lower threshold is 40% and the upper threshold is 75%.

8. The method of claim 6 further comprising providing a programming interface for a user to program the lower and upper thresholds.

9. A method, comprising:
   operating a processor at a first power control strategy;
   determining whether a workload of a task running on a processor has fallen below a lower threshold;
   changing to a second power control strategy to operate the processor based on determining that the workload of the task has fallen below the lower threshold;
   starting a marker timer upon starting the task, said marker timer expiring at a marker point in time, said marker point in time being a predetermined portion of a maximum time the task is allowed to complete.

10. The method of claim 9 further comprising determining whether the task has completed upon expiration of the marker timer and controlling a processor frequency based on whether or not the task has completed upon expiration of the marker timer.

11. A system, comprising:
    a processor; and
    a power and clock supply coupled to said processor;

wherein said processor asserts an operating point signal to said power and clock supply to cause the power and clock supply to implement an operating point for the processor, wherein the processor asserts said operating point signal to cause the power and clock supply to operate the processor in a first power control strategy, determines whether a workload of a task running on the processor has fallen below a lower threshold and, based on the workload of the task being below the lower threshold, asserts said operating signal to cause the power and clock supply to operate the processor in a second power control strategy, and wherein the second power control strategy initially includes a lower frequency for operating the processor and then switches to a higher frequency based on the task not completing by a marker point in time.

12. The system of claim 11 wherein the first power control strategy includes a continuous clock frequency.

13. The system of claim 11 wherein the second power control strategy includes the processor's frequency remaining at the lower frequency based on the task completing by the marker point in time.

14. The system of claim 11 wherein the processor asserts the signal to the power and clock supply to cause the power and clock supply to operate the processor in the first power control strategy based on determining that the task did not complete by the marker point in time.

15. The system of claim 11 wherein the processor starts a marker timer upon starting the task, said marker timer expiring at a marker point in time, said marker point in time being a predetermined portion of a maximum time the task is allowed to complete.

16. The system of claim 15 wherein the processor determines whether the task has completed upon expiration of the marker timer and asserts the signal to the power and clock supply to control a frequency for the processor based on whether or not the task has completed upon expiration of the marker timer.

17. The system of claim 11 wherein a plurality of tasks run on the processor and wherein the change to the second power control strategy is based on determining that the workload of any of the tasks has fallen below the lower threshold.

18. A processor, comprising:
a processor core; and
a dynamic power control (DPC);
wherein said DPC asserts an operating point signal to a power and clock supply to cause the power and clock supply to implement an operating point for the processor, and wherein the DPC asserts said operating point signal to request the power and clock supply to operate the processor in a first power control strategy, determines whether a workload of a task running on the processor has fallen below a lower threshold and, based on the workload of the task being below the lower threshold, asserts said operating signal to request the power and clock supply to operate the processor in a second power control strategy, and wherein the second power control strategy initially includes a lower frequency for operating the processor and then switches to a higher frequency based on the task not completing by a marker point in time.

19. The processor of claim 18 wherein the first power control strategy includes a continuous clock frequency.

20. The processor of claim 18 wherein the second power control strategy includes the processor's frequency remaining at the lower frequency based on the task completing by the marker point in time.

21. The processor of claim 18 wherein the DPC asserts the signal to the power and clock supply to request the power and clock supply to operate the processor in the first power control strategy based on determining that the task did not complete by the marker point in time.

22. The processor of claim 18 wherein the DPC starts a marker timer upon starting the task, said marker timer expiring at a marker point in time, said marker point in time being a predetermined portion of a maximum time the task is allowed to complete.

23. The processor of claim 22 wherein the DPC determines whether the task has completed upon expiration of the marker timer and asserts the signal to the power and clock supply to control a frequency for the processor based on whether or not the task has completed upon expiration of the marker timer.

* * * * *